E. B. TYLER.
EXPANSION JOINT.
APPLICATION FILED MAR. 20, 1914.

1,191,486.

Patented July 18, 1916.
2 SHEETS—SHEET 1.

WITNESSES

INVENTOR
E. B. Tyler.

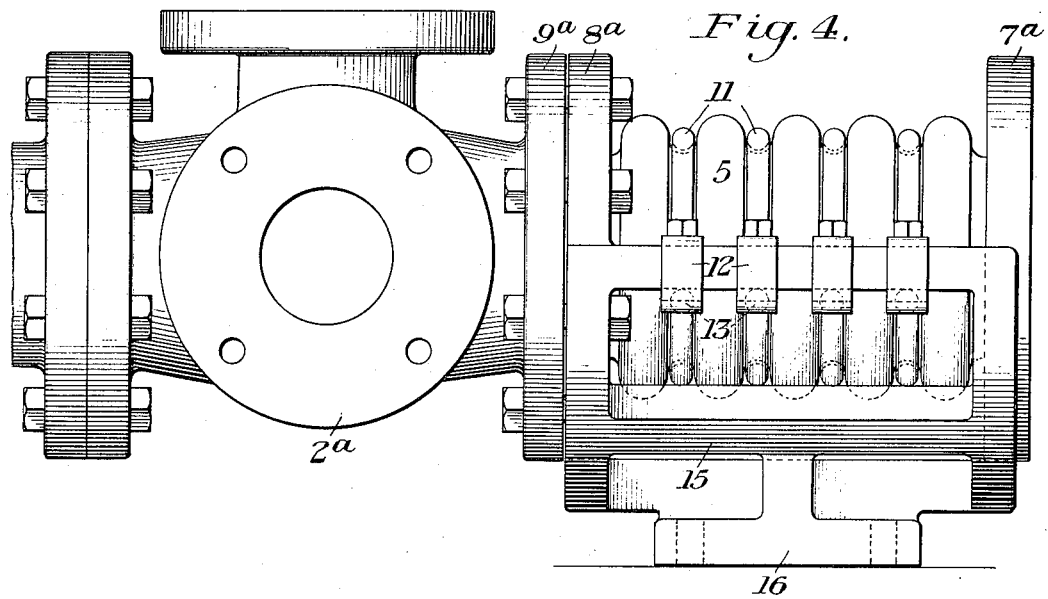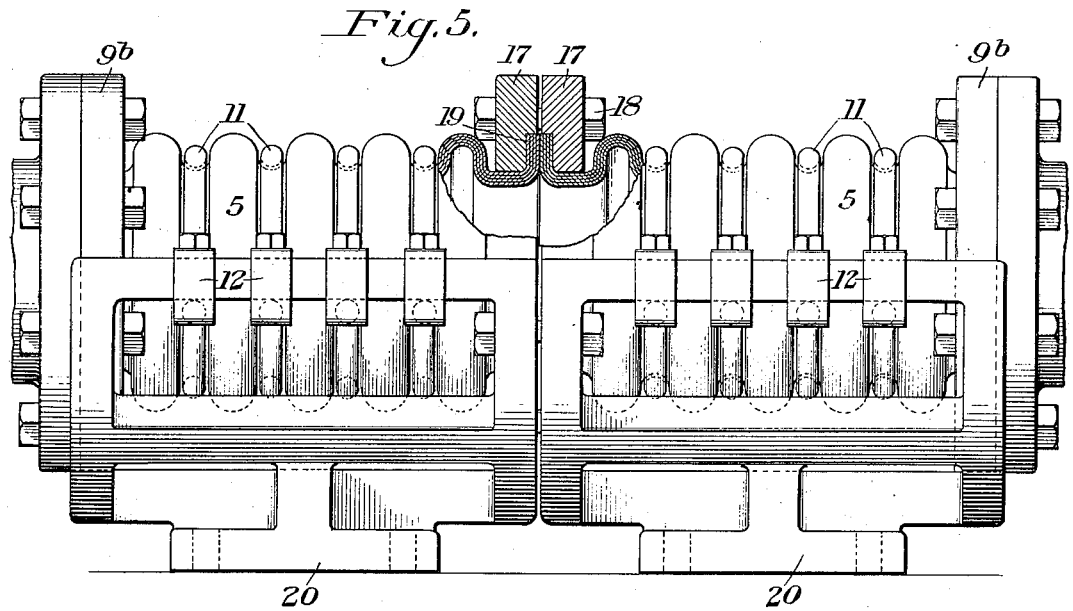

UNITED STATES PATENT OFFICE.

EDWARD B. TYLER, OF PITTSBURGH, PENNSYLVANIA.

EXPANSION-JOINT.

1,191,486.  Specification of Letters Patent.  Patented July 18, 1916.

Application filed March 20, 1914. Serial No. 826,044.

*To all whom it may concern:*

Be it known that I, EDWARD B. TYLER, a citizen of the United States, and a resident of Pittsburgh, in the county of Allegheny and State of Pennsylvania, have invented a new and useful Improvement in Expansion-Joints, of which the following is a full, clear, and exact description, reference being had to the accompanying drawings, forming part of this specification, in which—

Figure 1:
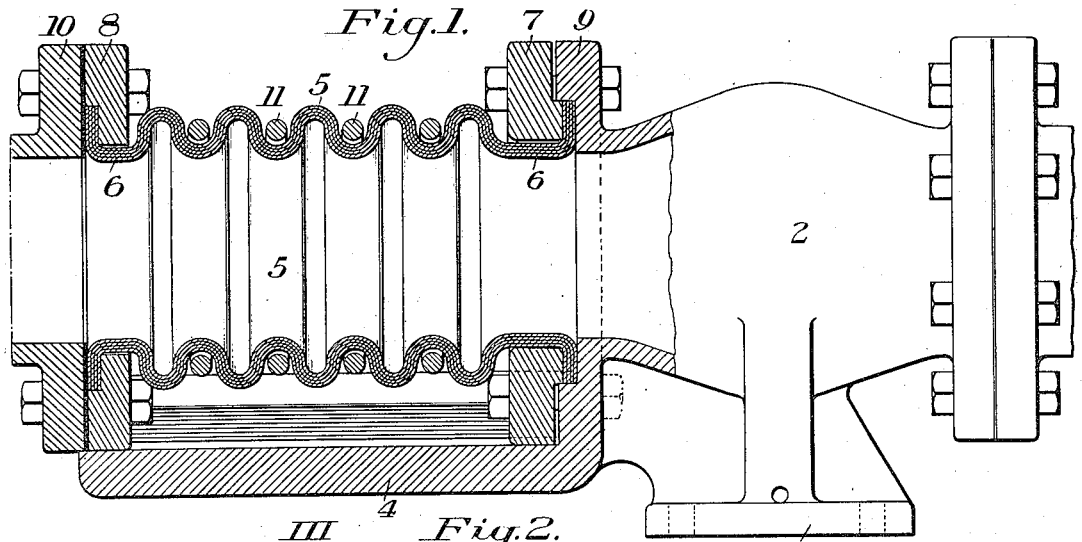
Figure 2:
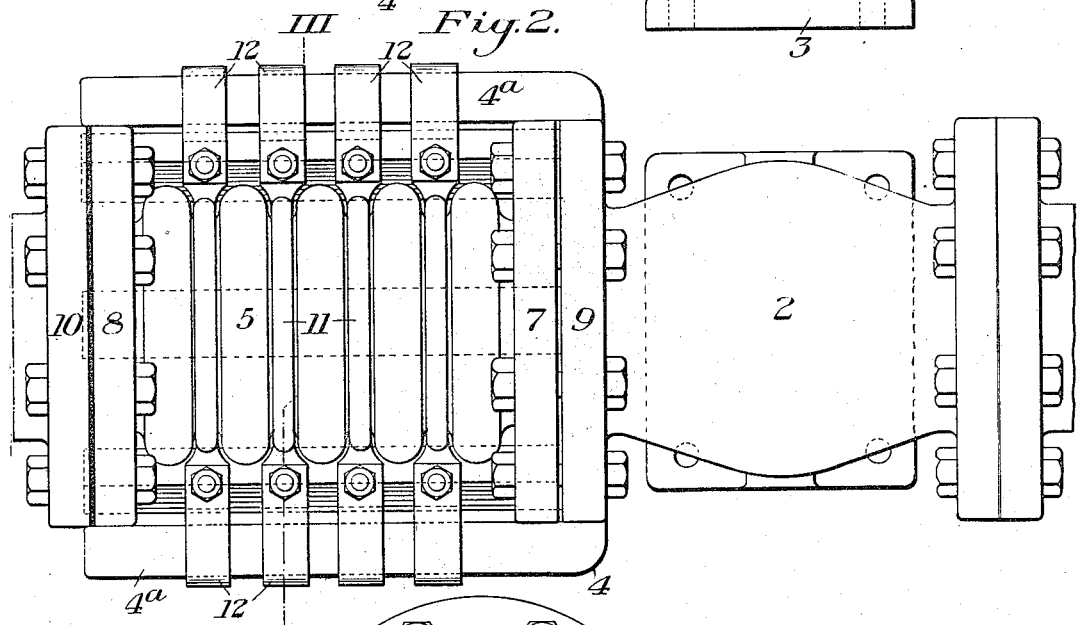
Figure 3:
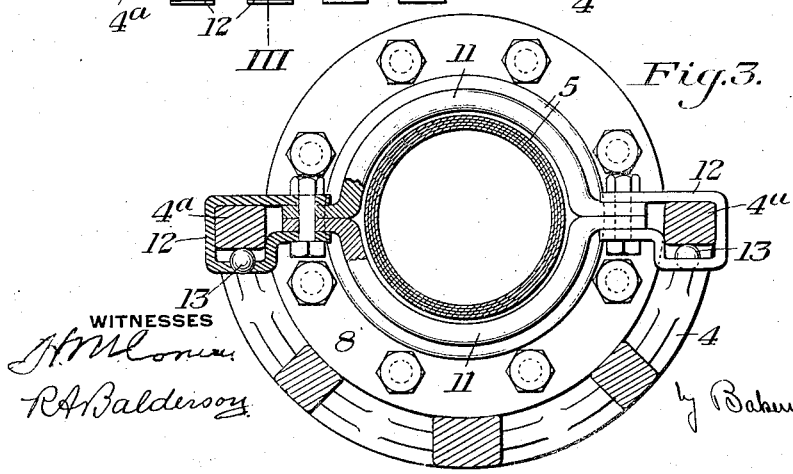

Figure 1 is a view partly in side elevation and partly in vertical section showing one form of expansion joint embodying my invention; Fig. 2 is a plan view of the same; Fig. 3 is a section on the line III—III of Fig. 2; Fig. 4 is a side elevation showing a modification; and Fig. 5 is a side elevation, partly broken away, showing another modification.

My invention has relation to expansion joints; and is designed to provide a simple and efficient joint of this character adapted for general use in pipe lines, and of particular advantage in connection with pipes of relatively large diameters such as are employed in heating systems.

The nature of my invention will be best understood by reference to the accompanying drawings in which I have shown several embodiments thereof and which will now be described, it being premised, however, that the invention is susceptible of other embodiments and may be modified in its details within the scope of the appended claims.

Referring first to that form of my invention shown in Figs. 1 to 3, inclusive, the numeral 2 designates a pipe connection, which may be either a two-way or three-way connection, and which may be such as would be used at a manhole of the system. This pipe connection member is shown as having a supporting base 3 which is adapted to be rigidly secured to a suitable foundation. One end of this member is formed with a cradle-like extension 4 for supporting the expansion joint. This cradle-like extension is preferably substantially semicircular in its cross sectional form and surrounds the lower portion of the expansion joint. 5 designates a corrugated expansible pipe section which is sufficiently flexible to give the required degree of longitudinal expansion and contraction in the joint. It may be made of any suitable or well known material such as copper, and may be either of single wall or laminated construction, the latter being indicated in Figs. 1 and 3. The end portions of this expansible pipe member are formed with neck portions 6 which extend through circular openings in the end rings 7 and 8. Its end portions are preferably flanged outwardly, the flange at one end being clamped between the ring 7 and the bolting flange 9 of the member 2; while that at the other end portion is similarly clamped between the ring 8 and a bolting flange 10 on the adjacent pipe section. The rings 7 and 8 are respectively securely bolted to the bolting flanges 9 and 10; and are supported within the end portions of the cradle extension 4. 11 designate sectional clamping rings which engage the exterior grooves of the corrugated expansible member, the sections of these rings being secured to each other and to supporting brackets 12 at opposite sides. The clamping rings somewhat loosely engage the corrugations of the expansible section; and the brackets 12 loosely engage the upper longitudinal bars 4ª of said cradle extension and preferably have antifriction bearings on such bars, such as the balls shown at 13 in Fig. 3.

It will be readily seen that the expansible section 5, by reason of its flexible and corrugated character, will take care of a considerable amount of longitudinal expansion and contraction movements in a pipe line between adjacent anchorage connections, while at the same time a tight joint is maintained. The clamping rings 11 confine the expansible section in its generally alined position, while at the same time they permit free expansive and contractive movements thereof. These rings being movably supported on the cradle extension, they are free to move longitudinally with said member.

In the form of my invention shown in Fig. 4, the supporting cradle 15 for the expansion joint, instead of being formed as a part of the pipe connection 2ª, is separately formed and is provided with its own supporting base 16. The end ring 8ª is formed integral with the cradle and is bolted to the bolting flange 9ª of the member 2ª. The other end ring 7ª is supported in the cradle and is designed to be bolted to a flange on the next pipe section. The joint is otherwise the same as that first described.

Fig. 5 shows a form of my invention which may be employed independently of a pipe connection such as that shown at 2 or 2ª in the other figures; and which is designed to form an expansible connection for two adjacent sections of the conduit pipe. One of these sections is bolted to the end ring 9ᵇ which is supported in a cradle similar to that shown in Fig. 4. The other conduit section is similarly bolted to an end ring 9ᵇ supported in a second cradle. The two cradles are in longitudinal alinement and their integral end rings 17 are secured to each other by bolts 18, and clamped between them are the flanged end portions 19 of the expansible pipe sections. In fact this construction consists of two cradles and expansible sections such as shown in Fig. 4 placed end to end with their integral or rigid rings bolted together. Each cradle has its own base 20 by which it may be rigidly anchored to a suitable support.

The advantages of my invention will be apparent since it provides an expansion joint of very simple and efficient character capable of use with pipes of large diameters and where relatively large expansion and contraction movements must be taken care of. The expansion joint can be readily adapted to various particular locations and conditions in different pipe lines.

I claim:

1. An expansion joint, comprising a support, an end member rigid with said support, a corrugated expansible section fixed at one end to said end member, an opposite end member to which the other end of the expansible section is secured, the second end member being capable of movement longitudinally of the support, said end members having means for connecting the joint in a pipe line or conduit, together with clamping rings seated externally in the grooves of the expansible section, and a guide carried by said support and with which said rings have a sliding engagement; substantially as described.

2. An expansion joint for pipe lines, comprising a cradle-like supporting member having a circular ring rigid with one end portion thereof, another circular ring loosely seated in the opposite end portion of the supporting member, an expansible pipe section secured in and extending between said rings, and a clamp embracing said pipe section and also having a sliding engagement with said support; substantially as described.

3. An expansion joint for pipe lines, comprising a cradle-like supporting member having an integral circular ring at one end and a loose circular ring at the other end, a corrugated expansible pipe section secured in said rings, a plurality of tie members engaging the corrugations of said section and also engaging the supporting member at opposite sides of said section, and antifriction bearings between the tie members and the supporting member, whereby the tie members may move freely with the said section in its expansion and contraction movements; substantially as described.

In testimony whereof, I have hereunto set my hand.

EDWARD B. TYLER.

Witnesses:
W. C. LYON,
H. M. CORWIN.